Patented Nov. 15, 1932

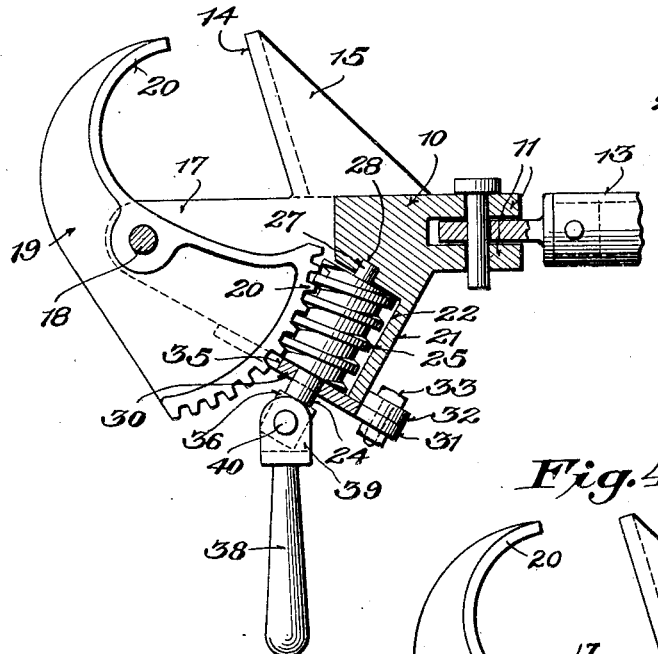

1,888,122

UNITED STATES PATENT OFFICE

EARL F. GREEN, OF YORK, PENNSYLVANIA

HITCH

Application filed August 19, 1927. Serial No. 214,086.

This invention relates to hitches and has for its object the provision of a simple and efficient hitch, particularly one which can be conveniently used with towing mechanism. Further objects of the invention relate to the details of the construction of the hitch tending generally to improve its action and its convenience of use.

While the hitch of the present invention will be described in detail in one particular embodiment, this is done for convenience of description and not as a means of limitation.

In the drawing:—

Figure 1 is a side elevation.
Figure 2 is a front view.
Figure 3 is a top plan view, and
Figure 4 is a modification partly in section.

The towing hitch comprises an attaching member 10 having spaced and perforated ears 11 on the forward end to receive a bolt or pin for attachment to the towing pole indicated at 13. Two fixed jaws 14 rise vertically from the body of the member 10 and are reenforced by triangular stiffening ribs 15. In line with the jaws and the same distance apart is a pair of extensions 17 perforated at their ends to receive the pivoting bolt 18 of the hook member 19, the curved hook 20 of which forms a movable jaw to clamp a vehicle axle for example to the fixed jaws 14. The member 19 extends forwardly in the slot between the extensions 17 and jaws 14 and has at its rear arcuate end a segmental worm gear 20 by which the bill or hook is turned toward or from the jaws 14.

The under side of the attaching member of hitch has a downwardly and forwardly inclined face 21 and is formed with a socket 22 to receive a shaft 24 having a worm 25 thereon that engages the gear 20 on the hook member 19. Shaft 24 has a reduced end 27 circular in cross section that engages in a circular recess 28 in the inner wall of the socket 22, and shaft 24 is held in the socket by means of a cover plate 30 having ears 31 that seat on ears 32 provided with alined openings through which bolts or rivets 33 are passed to hold the cover plate 30 in position.

Cover plate 30 is provided with a circular notch 35 to receive the shaft 24 and with a communicating notch that alines with the slot through which moves the extension carrying the gear 20. The outer extremity of the shaft 24 may be polygonal in cross section as shown at 36, and 38 is an operating handle for the shaft having spaced ears 39 to receive the polygonal end and being pivotally secured thereto by means of a pin or bolt 40 extending thru the ears and an opening in the end of the shaft.

When the hitch is used either with or without the towing pole, the jaws 14 are brought into engagement with the axle or other portion of the vehicle to be towed and the hitch lifted until the top faces of the extensions 17 engage this axle or other part. The worm is now turned by means of its handle until the hook or movable jaw grips the axle firmly. The handle is now dropped and it will swing to vertical position securely locking the jaws in their clamping position due to the angularity of the worm shaft, thus permitting a rather steeper worm than would be safe with a vertical worm shaft.

In the modification shown in Figure 4 a somewhat simpler form of device is presented which is preferred under some circumstances. The attaching member, instead of receiving a worm, is hollowed out to form three cavities 41, 42 and 43 near the inclined face 21, the extensions 17 and pivoting bolt 18 being as in the previously described form as is the curved hook 20 of the hook member 19a which is provided with two opposed inwardly directed frusto-conical portions 44 and 45 which position a square nut 48 thru which is threaded a screw 50 having a hand wheel 51 for convenient manipulation.

The hook member 19a is transversely slotted to receive the nut 48 and after the nut is approximately positioned the screw 50 is inserted thru the aligned conical openings 54 and 55. The rounded seats 44 and 45 are spaced from one another sufficiently to permit considerable tilting of the screw and nut within the hook member so that the screw can readily be moved from the upper cavity 41 which takes care of large openings to the intermediate cavity 42 or to the cavity 43 which is used when the distance between the movable jaw 20 and the fixed jaws 14 is smallest.

We assume that the device is in the position shown in Figure 4 and is grasping a shaft of any kind. If by screwing up the hand wheel 51 a firm grip can be had this is done but in case the shaft is too small to be grasped the operator unscrews the hand wheel 51 so as to make the screw 50 loose in the cavity 41 sufficiently to permit it to pass the lip 60 between the upper and intermediate cavities and then turns the hand wheel so as to bring the screw in firm engagement with this intermediate cavity. The nut is permitted only a slight angular movement in its slot and the lip such as 60 insures that the device cannot accidentally slip.

What I claim is:—

1. A towing hitch, comprising an attaching member having a jaw to engage a vehicle axle, a hook member pivotally secured to the attaching member to clamp said axle against said jaw, a toothed extension on said hook, a shaft journaled in said attaching member, and a worm on said shaft engaging the teeth on the hook member.

2. The device of claim 1 in which the axis of the worm is tilted to both horizontal and vertical in normal towing position, and the shaft carries a pivoted handle.

3. A towing hitch comprising an attaching member having a pair of parallel jaws and a pair of parallel extensions at right angles to the jaw faces, a member pivoted at the end of the extensions and having a jaw at one side of the pivot and a segmental gear at the other side of the pivot, a worm meshing with said gear, and operating means pivoted to the worm so as to hang by gravity at an angle to the axis of the worm.

4. In a towing hitch, an attaching member having means whereby it is to be secured to a towing truck, a substantially horizontal supporting surface, a hook member pivoted near the free end of the attaching member, an abutment rising sharply upward from said supporting surface between said free end and said attaching member, said hook member having a concave face adapted to rise above the horizontal surface to engage a portion of a vehicle to be towed so as to slide said portion along the horizontal surface of the attaching member and into contact with said abutment to clamp the vehicle portion against said abutment, and means for locking the hook in a plurality of angular relations with the attaching member to accommodate different sized portions of the towed vehicle.

5. The device of claim 4 in which the locking means comprises a toothed segment on the hook member and a worm on the attaching member in engagement with the teeth on said segment.

6. The device of claim 4 in which the attaching member is provided with a plurality of depressions and the locking means comprises a screw carried by the hook member and engaging selectively a chosen one of the depressions.

7. A towing hitch comprising an attaching member having a plurality of depressions, a hook member pivoted to said attaching member, and adjusting means on said hook member adapted to engage any one of the plurality of depressions.

8. The device of claim 7 in which the adjusting means is a screw having a rocking engagement with the hook member.

9. In a towing hitch, an attaching member having at one end means for securing the hitch to a towing truck, at the other end a supporting surface, and between the ends an abutment rising upwardly from the member, a hook member centrally pivoted at the free end of the attaching member, a plurality of ridges extending from the attaching member below the abutment to provide a plurality of depressions, and rocking means carried by the hook member below its pivot for engaging a selected depression between adjacent ridges to clamp a portion of a vehicle to be towed between the hook, the surface, and the abutment.

10. The device of claim 9 in which further adjusting means are provided for moving the hook member while the rocking means is in engagement with a chosen depression.

11. In a towing hitch, a main member having a free end and a connecting end, a supporting surface between the two ends, an abutment rising from the surface and slanting toward the free end, a pivot in said free end, a curved hook member substantially centrally supported on said pivot, the curvature of said hook being concave and facing the abutment whereby movement of the hook member varies the opening of the jaw formed by the abutment, the supporting surface and the hook, a curved rack on one of said members and a cooperating pawl on the other member said pawl being manually movable whereby said jaw may be clamped on a portion of a vehicle to be towed.

In testimony whereof I affix my signture.

EARL F. GREEN.